United States Patent
Hara et al.

(10) Patent No.: US 7,073,045 B2
(45) Date of Patent: Jul. 4, 2006

(54) MEMORY INTERFACE CIRCUIT HAVING PLURALITY OF PREFETCH BUFFERS, EACH ASSIGNED TO EITHER FIRST PREFETCH BUFFER ENABLED FOR REWRITE OR SECOND PREFETCH BUFFER DISABLED FOR REWRITE DURING NORMAL OPERATION PERIOD

(75) Inventors: Akio Hara, Kawasaki (JP); Masaaki Tani, Kawasaki (JP); Kenji Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 10/797,104

(22) Filed: Mar. 11, 2004

(65) Prior Publication Data
US 2004/0268085 A1 Dec. 30, 2004

(30) Foreign Application Priority Data
Jun. 27, 2003 (JP) .............................. 2003-184366

(51) Int. Cl.
*G06F 9/32* (2006.01)
(52) U.S. Cl. ..................... 711/213; 711/217; 711/119; 711/125
(58) Field of Classification Search ................ 711/119, 711/125, 213, 217–218
See application file for complete search history.

(56) References Cited

U.S. PATENT DOCUMENTS 5,680,564 A * 10/1997 Divivier et al. ............. 712/205
2004/0260908 A1 * 12/2004 Malik et al. ................. 711/213

FOREIGN PATENT DOCUMENTS

| JP | 62-259158 | 11/1987 |
| JP | 6-028258 | 2/1994 |
| JP | 2000-347931 | 12/2000 |

* cited by examiner

*Primary Examiner*—Matthew Kim
*Assistant Examiner*—Hetul Patel
(74) *Attorney, Agent, or Firm*—Staas & Halsey LLP

(57) ABSTRACT

Each prefetch buffer has a tag register for storing a branch address and a data register for storing instruction data. Each of the prefetch buffers is assigned to either a first prefetch buffer rewritable during a normal operation period and a second prefetch buffer to be disabled for rewrite during the normal operation period. The second prefetch buffer can thus be prevented from being rewritten even if a central processor outputs branch addresses frequently. This realizes an improvement in the instruction fetch efficiency of the central processor and an improvement in the entire system performance. The fetch efficiency can be improved particularly in such systems that branch addresses occur frequently and some of them occur repeatedly.

11 Claims, 6 Drawing Sheets

MEMORY INTERFACE CIRCUIT HAVING PLURALITY OF PREFETCH BUFFERS, EACH ASSIGNED TO EITHER FIRST PREFETCH BUFFER ENABLED FOR REWRITE OR SECOND PREFETCH BUFFER DISABLED FOR REWRITE DURING NORMAL OPERATION PERIOD

CROSS REFERENCE TO RELATED APPLICATION

This application is based upon and claims the benefit of priority from Japanese Patent Application No. 2003-184366, filed on Jun. 27, 2003, the entire contents of which are incorporated herein by reference.

BACKGROUND OF THE INVENTION

1. Field of the Invention

The present invention relates to a memory interface circuit which has prefetch buffers for improving the fetch efficiency of instruction data that is fetched from a memory by a central processor such as a microprocessor.

2. Description of the Related Art

For improving the fetch efficiency of instruction data, a cache memory is typically interposed between a microprocessor and a main memory. Recently, various techniques have been proposed for the sake of a further improvement in the fetch efficiency of the cache memory.

For example, there has been proposed a technique in which a plurality of pieces of instruction data corresponding to the top address and subsequent addresses of an interruption are transferred to the cache memory during a period between when the microprocessor receives an interruption request and when it starts the interruption processing, thereby yielding a cache hit at the time of the interruption processing (disclosed in, for example, Japanese Unexamined Patent Application Publication No. 2000-347931).

Besides, there has been proposed a technique in which a cache memory dedicated to interruption is provided aside from a normal cache memory in order to improve the cache hit efficiency after a return from interruption processing (disclosed in, for example, Japanese Unexamined Patent Application Publication No. Hei 6-28258).

Moreover, there has been proposed a technique pertaining to an interruption request circuit of a microprocessor, in which top addresses corresponding to interruption request sources are stored into a memory previously in order to reduce the time for searching for the interruption request sources (disclosed in, for example, Japanese Unexamined Patent Application Publication No. Sho 62-259158).

Meanwhile, there has been proposed a memory interface circuit which is provided with a prefetch buffer of small memory capacity instead of the cache memory, allowing a cost reduction without a drop in instruction fetch efficiency. In this technology, the prefetch buffer stores branch addresses alone. The memory interface circuit prefetches instruction data at an address obtained by incrementing the previous address by one when the address output from the microprocessor is not a branch address. Thus, instruction data corresponding to consecutive addresses can be read in a short access time equivalent to cache hits. Besides, if the instruction data corresponding to a branch address lies in the prefetch buffer, it can be read in a short access time equivalent to a cache hit.

SUMMARY OF THE INVENTION

According to one of the aspects of the memory interface circuit of the present invention, an address generating unit outputs an internal address received from a central processor to an external memory as an access address for prefetching instruction data stored in the external memory when the internal address is a branch address. The address generating unit increments the branch address by one at every access cycle and outputs it as the access address until a next branch address is received. With consecutive internal addresses, the instruction data stored in the external memory can thus be prefetched by using the access addresses generated by the address generating unit. It is therefore possible to improve the fetch efficiency of the instruction data. Besides, it is not necessary to retain the instruction data corresponding to the consecutive internal addresses in any prefetch buffer. It is therefore possible to reduce the number of prefetch buffers to a minimum.

A plurality of prefetch buffers each have a tag register for storing a branch address and a data register for storing instruction data stored in an area of the external memory designated by this branch address. Each of the prefetch buffers is assigned to either a first prefetch buffer which is rewritable during a normal operation period or a second prefetch buffer to be disabled for rewrite during the normal operation period. The second prefetch buffer contains in advance a specified branch address and instruction data stored in an area of the external memory designated by this branch address. Consequently, during the normal operation period, rewrites are done only in the first prefetch buffers by branch addresses output from the central processor and instruction data corresponding to these branch addresses. A main control unit controls operation of the address generating unit, a first address comparing unit, and a data selecting unit during the normal operation period in which the central processor outputs the internal addresses successively.

During the normal operation period, the first address comparing unit activates a tag hit signal when the internal address output from the central processor coincides with the branch address retained in the tag register. Upon the activation of the tag hit signal is, the data selecting unit outputs to the central processor instruction data read from the data register corresponding to the tag register containing the hit branch address. That is, the central processor can fetch the instruction data from the external memory without a wait. Upon the inactivation of the tag hit signal, the data selecting unit outputs to the central processor instruction data corresponding to the branch address read from the external memory.

A predetermined number of ones of the prefetch buffers are assigned to second prefetch buffers which are disabled for rewrite. Consequently, even when branch addresses are output from the central processor frequently, it is possible to prevent certain branch addresses and instruction data retained in the second prefetch buffers from being rewritten. As a result, the central processor can be improved in instruction fetch efficiency while the entire system performance can also be improved. The fetch efficiency can be improved particularly in such systems that branch addresses occur frequently and some of them occur repeatedly.

According to another aspect of the memory interface circuit of the present invention, a split register stores either the number of prefetch buffers to be used as the first prefetch buffer(s) or the number of the same to be used as the second prefetch buffer(s). Each of the prefetch buffers is assigned to either the first prefetch buffer or the second prefetch buffer depending on a value of the split register during an initial setting period preceding the normal operation period. The number of second prefetch buffers can be set to a desired number by setting the value of the split register according to system characteristics. In other words, it is possible to provide an optimum memory interface circuit for the system.

According to another aspect of the memory interface circuit of the present invention, the main control unit receives a branch address through a data bus connected to the central processor and stores the received branch address in the tag register of the second prefetch buffer during an initial setting period preceding the normal operation period. The main control unit stores instruction data stored in an area of the external memory designated by this branch address into the data register corresponding to the tag register of the second prefetch buffer. This eliminates the need for the central processor to store the instruction data in the data register of the second prefetch buffer. As a result, the central processor can be improved in performance during the initial setting period.

According to another aspect of the memory interface circuit of the present invention, the main control unit stores the branch address received through the data bus in the tag register of the second prefetch buffer during the initial setting period. Then, in response to the start register being set by a write from the central processor, the main control unit outputs the branch address retained in the tag register of the second prefetch buffer to the external memory through the address generating unit, and stores instruction data read from the external memory in the data register corresponding to the tag register of the second prefetch buffer. Due to the provision of the dedicated start register, the central processor can easily control the main control unit to store the instruction data in the data register of the second prefetch buffer at arbitrary timing.

According to another aspect of the memory interface circuit of the present invention, a data buffer temporarily stores instruction data which is prefetched from the external memory according to the access address. A second address comparing unit outputs a prefetch hit signal when the internal address coincides with the access address for prefetching the instruction data from the external memory. The data selecting unit outputs the instruction data retained in the data buffer to the central processor when the prefetch hit signal is activated. When the prefetch hit signal is inactivated, the data selecting unit outputs to the central processor the instruction data corresponding to the branch address read from the external memory. The provision of the data buffer makes it possible for the data selecting unit to output to the central processor the instruction data prefetched from the external memory without a loss when the central processor outputs consecutive internal addresses.

According to another aspect of the memory interface circuit of the present invention, a branch counter counts the number of times the central processor outputs branch addresses during the normal operation period. Upon determining that a ratio of a number of times at which the branch address stored in the tag register of the first prefetch buffer is hit to a counter value of the branch counter exceeds a predetermined value during the normal operation period, the main control circuit switches this first prefetch buffer to the second prefetch buffer. Since first prefetch buffers retaining branch addresses which occur at high frequency are switched to second prefetch buffers which are disabled for rewrite, it is possible to improve the instruction fetch efficiency in accordance with the actual operating state of the system.

According to another aspect of the memory interface circuit of the present invention, upon determining that a ratio of a number of times at which the branch address stored in the tag register of the second prefetch buffer is hit to a counter value of the branch counter is equal to or less than a predetermined value during the normal operation period, the main control circuit changes this second prefetch buffer to the first prefetch buffer. Since the second prefetch buffers storing branch addresses which occur at low frequency are switched to the rewritable first prefetch buffers, it is possible to improve the instruction fetch efficiency in accordance with the actual operating state of the system.

According to another aspect of the memory interface circuit of the present invention, an address generating unit outputs an internal address received from a central processor to an external memory as an access address for prefetching instruction data stored in the external memory when the internal address is a branch address. The address generating unit increments the branch address by one at every access cycle and outputs it as the access address until a next branch address is received. With consecutive internal addresses, the instruction data stored in the external memory can thus be prefetched by using the access addresses generated by the address generating unit. It is therefore possible to improve the fetch efficiency of the instruction data. Besides, it is not necessary to store the instruction data corresponding to the consecutive internal addresses in any prefetch buffer. It is therefore possible to reduce the number of prefetch buffers to a minimum.

A plurality of prefetch buffers each have a tag register for storing a branch address and a data register for storing instruction data stored in an area of the external memory designated by this branch address. Each of the prefetch buffers is assigned to either a first prefetch buffer rewritable during the normal operation period or a second prefetch buffer to be disabled for rewrite during the normal operation period and containing in advance a specified branch address and instruction data stored in an area of the external memory designated by the specified branch address. Consequently, during the normal operation period, rewrites are done only in the first prefetch buffers by branch addresses output from the central processor and instruction data corresponding to these branch addresses.

A branch counter counts the number of times the central processor outputs branch addresses during the normal operation period. A main control unit controls operation of the address generating unit, a first address comparing unit, a data selecting unit, and the branch counter during the normal operation period in which the central processor outputs internal addresses successively.

During the normal operation period, the first address comparing unit activates a tag hit signal when the internal address output from the central processor coincides with the branch address retained in the tag register. When the tag hit signal is activated, the data selecting unit outputs to the central processor instruction data read from the data register corresponding to the tag register containing the hit branch address. That is, the central processor can fetch the instruction data from the external memory without a wait. When the tag hit signal is inactivated, the data selecting unit outputs to the central processor instruction data corresponding to the branch address read from the external memory.

Upon determining that a ratio of a number of times at which the branch address stored in the tag register of the first prefetch buffer is hit to a counter value of the branch counter exceeds a predetermined value during the normal operation period, the main control circuit switches this first prefetch buffer to the second prefetch buffer. Changing first prefetch buffers which store branch addresses occurring with high frequency to second prefetch buffers which are disabled for rewrite makes it possible to improve the instruction fetch efficiency of the central processor and also improve the entire system performance. The fetch efficiency can be improved particularly in such systems that branch addresses occur frequently and some of them occur repeatedly. This eliminates the necessity of the initial setting to assign a predetermined number of prefetch buffers to first or second prefetch buffers so that the main control circuit can be simplified in configuration.

According to another aspect of the memory interface circuit of the present invention, each of the prefetch buffers has a recognition flag for indicating which of a first or second prefetch buffer it is used for. By mean of the recognition flags, the main control circuit can easily recognize which of the first or second prefetch buffers they are assigned to. As a result, the main control circuit can be simplified in configuration.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
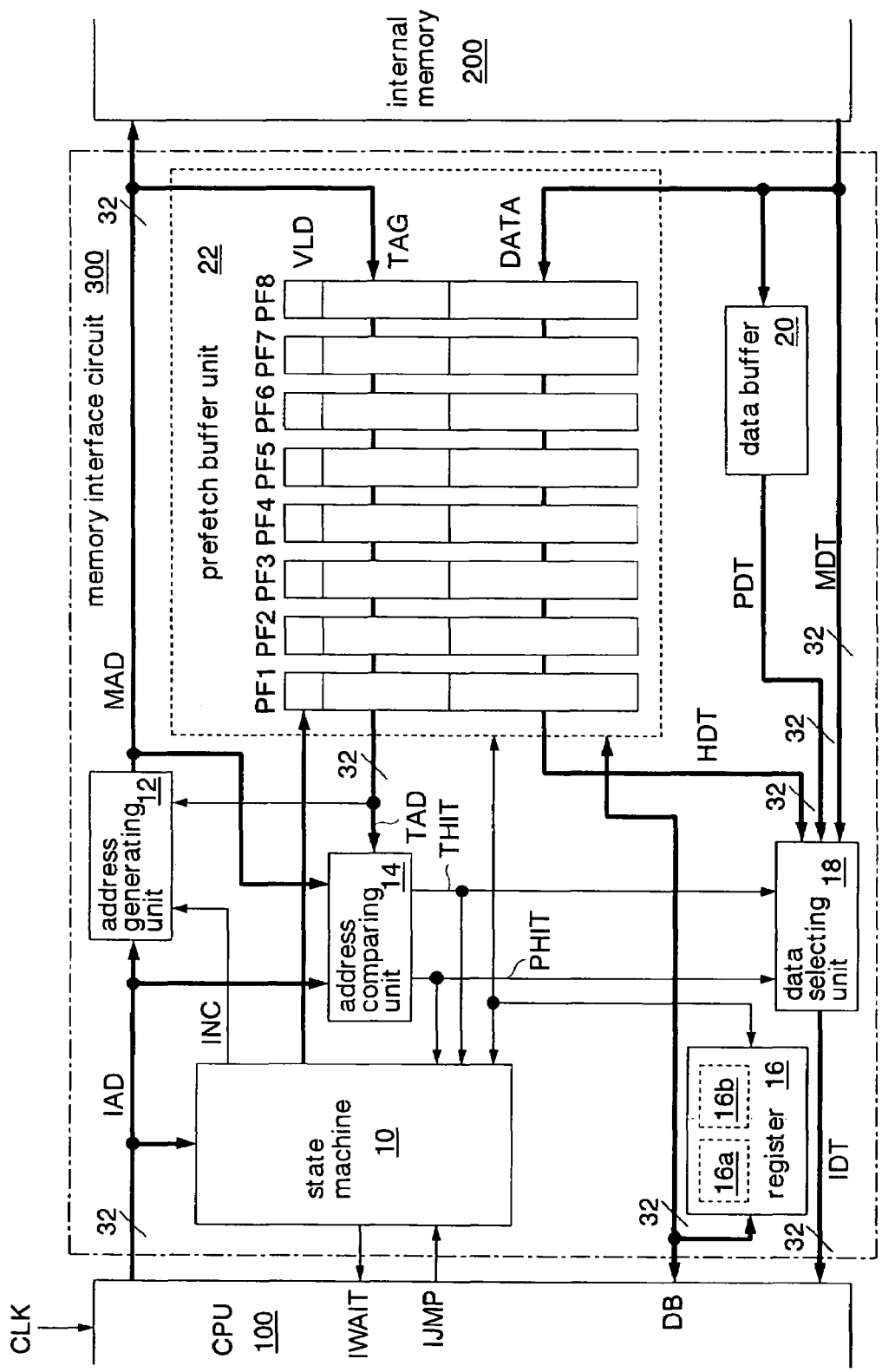
FIG. 1 is a block diagram showing a first embodiment of the memory interface circuit of the present invention.

The present invention has been made for the purpose of solving the following problems.

(1) In the conventional prefetch buffer method, however, the fetch efficiency drops when branch addresses occur frequently. For example, in a system in which branch addresses occur frequently and certain interruptions occur regularly, the occurrences of the branch addresses causes the instruction data corresponding to the top addresses of the interruptions retained in the prefetch buffer to be rewritten in succession.

(2) If the technique disclosed in Japanese Unexamined Patent Application Publication No. 2000-347931 is applied to a system in which interruptions occur frequently, the fetch efficiency drops because the data retained in the cache memory are rewritten. In addition, instruction data must be transferred to the cache memory between the occurrence of an interruption request and the start of the interruption processing. Consequently, this cache memory is effective only if an interruption request occurs while an instruction that accepts no interruption request is under execution. If an interruption request occurs during the execution of an instruction that accepts an interruption request, there is no sufficient lead time to transfer the instruction data to the cache memory.

(3) When the technique disclosed in Japanese Unexamined Patent Application Publication No. Hei 6-28258 is applied to a system in which interruptions occur frequently, the data retained in the interruption-dedicated cache memory can be rewritten with a drop in fetch efficiency.

(4) Japanese Unexamined Patent Application Publication No. Sho 62-259158 relates to the technique of retrieving interruption vector addresses in a short time, and thus cannot improve the fetch efficiency of instruction data that is retained in the memory areas designated by the interruption vector addresses. In other words, the fetch efficiency is low although interruptions frequently occur.

It is an object of the present invention to improve the fetch efficiency of instruction data that is fetched from a central processor such as a microprocessor. In particular, the object is to improve the fetch efficiency of instruction data in a system in which address branching occurs frequently.

Hereinafter, embodiments of the present invention will be described with reference to the drawings. In the drawings, each thick line represents a signal line that consists of a plurality of lines. Some of the blocks connected with the thick lines consist of a plurality of circuits each. The signal lines are designated by the same reference symbols as the names of the signals to be transmitted therethrough.

FIG. 1 shows a first embodiment of the memory interface circuit of the present invention. This memory interface circuit is incorporated into a single chip microcomputer.

The single chip microcomputer includes a CPU core 100 (central processor, microprocessor), an internal memory 200 (external memory to the CPU core 100), and a memory interface circuit 300 of the present invention connected therebetween. The single chip microcomputer is used, for example, as a control chip for controlling a stepping motor of a single-lens reflex camera, digital camera, etc. This type of application requires frequent interruption processing so as to monitor operation switches of the camera all the time and drive the stepping motor precisely.

In this embodiment, an instruction address bus IAD for transmitting an internal address IAD from the CPU core 100 and an instruction data bus IDT for transmitting instruction data are made of 32 bits each. Each single piece of instruction data consists of 16 bits. The CPU core 100 fetches two pieces of instruction data together at every two cycles of a clock CLK. The CPU core 100 thus requires a single clock cycle per a single piece of instruction.

The access cycle of the internal memory 200 is three clock cycles. To access the internal memory 200, the memory interface circuit 300 must therefore output a wait signal IWAIT to the CPU core 100 so that the bus cycle is extended by one clock cycle. Note that, when the clock CLK is divided in frequency inside the CPU core 100, the clock cycle refers to the cycle of the divided clock.

The memory interface circuit 300 has a state machine 10, an address generating unit 12, an address comparing unit 14, a register 16, a data selecting unit 18, a data buffer 20, and a prefetch buffer unit 22.

The prefetch buffer unit 22 has eight prefetch buffers PF1–PF8. The prefetch buffers PF1–PF8 each have a valid flag VLD (recognition flag) consisting of a single bit, a tag register TAG consisting of 32 bits, and a data register DATA consisting of 32 bits. A predetermined number of ones of the prefetch buffers PF1–PF8 function as normal prefetch buffers (first prefetch buffers) which are rewritable during a normal operation period in which the CPU core 100 outputs internal addresses IAD successively according to a program counter. The rest of the prefetch buffers function as interruption prefetch buffers (second prefetch buffers) which are disabled for rewrite during the normal operation period.

The valid flags VLD are bits for recognizing which of the normal prefetch buffers or interruption prefetch buffers the prefetch buffers PF1–PF8 operate as. During an initial setting period after power-on resetting, prefetch buffers having their valid flags VLD reset to "0" function as normal prefetch buffers. Prefetch buffers having their valid flags VLD set to "1" function as interruption prefetch buffers. Due to the provision of the valid flags VLD, the state machine 10 can easily recognize which of the two types of the prefetch buffers the prefetch buffers PF1–8 are assigned to. As a result, the state machine 10 is simplified in circuit configuration.

The tag registers TAG of the normal prefetch buffers retain branch addresses which the CPU core 100 outputs to access the internal memory 200. The tag registers TAG of the interruption prefetch buffers retain the top addresses of interruption vectors set by the system (user) during the initial setting period (top address is a kind of branch address; hereinafter, also referred to as branch address or interruption vector address).

The data registers DATA retain instruction data stored in the areas of the internal memory 200 designated by the branch addresses or interruption vector addresses retained in the tag registers TAG.

The state machine 10 operates as a main control unit for outputting control signals for controlling the operation of the address generating unit 12, the address comparing unit 14 (first and second address comparing units), the register 16, the data selecting unit 18, the data buffer 20, and the prefetch buffer unit 22.

Specifically, when the state machine 10 receives a branch signal UMP of high level from the CPU core 100, it determines that the internal address IAD is a branch address. The state machine 10 recognizes from a tag hit signal THIT of low level that this branch address is not retained in the prefetch buffer unit 22. The state machine 10 then outputs the wait signal IWAIT to the CPU core 100 over a period of a single clock cycle so that the instruction data corresponding to this branch address is read from the internal memory 200.

When the state machine 10 receives the branch signal UMP of low level and determines that the internal address IAD is not a branch address, i.e., when the internal address IAD is successively incremented by one at every access cycle, the state machine 10 outputs an increment signal INC of high level so that the address generating unit 12 outputs an address of the internal address IAD plus one (next address) as a memory access address MAD.

Besides, during the initial setting period after power-on resetting, the state machine 10 transfers a branch address or branch addresses (tag addresses) that are output from the CPU core 100 through a data bus DB, to the prefetch buffer unit 22. During the initial setting period, the state machine 10 sets valid flags VLD based on information that is written to the register 16 from the CPU core 100 through the data bus DB.

When the increment signal INC from the state machine 10 is at low level, the address generating unit 12 determines that the internal address IAD received from the CPU core 100 is a branch address, and outputs the branch address to the internal memory 200 as the memory access address MAD.

When the increment signal INC is at high level, the address generating unit 12 increments the branch address by one at every access cycle, and outputs the generated address to the internal memory 200 as the memory access address MAD. That is, after the reception of a branch address, the access address MAD is generated by the address generating unit 12 until the next branch address is received.

The address generated in the address generating unit 12 is used as a prefetch address for prefetching the instruction data stored in the internal memory 200. During the period where consecutive internal addresses IAD occur, the generation of the prefetch addresses by the address generating unit 12 allows prefetching of instruction data. Since the prefetch buffer unit 22 need not retain the instruction data corresponding to the consecutive addresses, the configuration thereof can be minimized.

The address comparing unit 14 activates the tag hit signal THIT to high level when the internal address IAD and the tag address TAD (branch address or interruption vector address) retained in any of the tag registers TAG coincide with each other. The address comparing unit 14 outputs a prefetch hit signal PHIT when the prefetch address (memory access address MAD) generated by the address generating unit 12 and the internal address IAD output from the CPU core 100 coincide with each other. Here, the instruction data prefetched is output to the CPU core 100 as internal data IDT.

The register 16 has a split register 16a and a start register 16b. The split register 16a consists of three bits (SPLIT[2:0] shown in FIG. 2), and retains split information for indicating which of the prefetch buffers PF1–PF8 is used as interruption prefetch buffers. The split information is written from the CPU core 100 through the data bus DB during the initial setting period. Then, in the initial setting period, the valid flags VLD of the prefetch buffers to operate as interruption prefetch buffers (at least one of PF1–PF8) are set to "1" based on the split information. Setting the number of interruption prefetch buffers to a desired number by the split register 16a makes it possible to provide an optimum memory interface circuit for the system.

The start register 16b consists of a single bit. The start register 16b is set to high level by the CPU core 100 through the data bus DB after the interruption vector addresses received through the data bus DB are stored into the tag registers TAG of the interruption prefetch buffers (at least one of PF1–PF8) during the initial setting period.

In response to the setting of the start register 16b, the state machine 10 operates so that the tag addresses TAD (interruption vector addresses) retained in the tag registers TAG of the interruption prefetch buffers are output to the internal memory 200 through the address generating unit 12. Then, instruction data read from the internal memory 200 is stored into the data registers DATA corresponding to the tag registers TAG that retain the interruption vector addresses. In this way, the start register 16b is used as a trigger for writing the instruction data to the data registers DATA of the interruption prefetch buffers.

The data buffer 20 temporarily retains instruction data prefetched from the internal memory 200.

When the tag hit signal THIT is activated, the data selecting unit 18 outputs instruction data HDT that is read from the data register DATA corresponding to the tag register TAG containing the hit branch address or interruption vector address, to the CPU core 100 as the internal data IDT. When the prefetch hit signal PHIT is activated, the data selecting unit 18 outputs instruction data PDT retained in the data buffer 20 to the CPU core 100 as the internal data IDT.

In addition, when the tag hit signal THIT and the prefetch hit signal PHIT are inactivated, the data selecting unit 18 outputs instruction data MDT corresponding to the branch address or interruption vector address, read directly from the internal memory 200, to the CPU core 100 as the internal data IDT.

Figure 2:
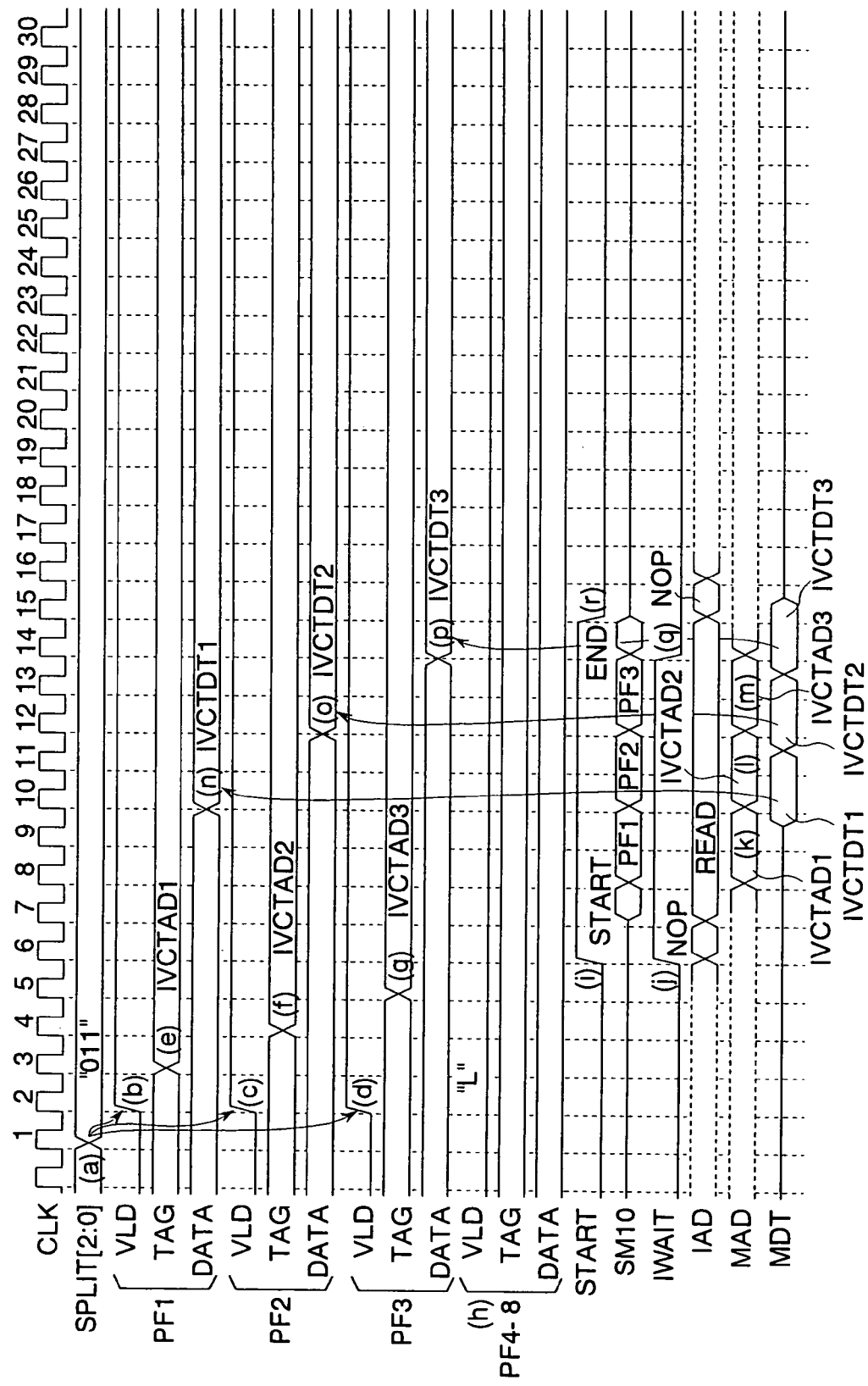
FIG. 2 is a timing chart showing the operation of the first embodiment during an initial setting period.

FIG. 2 shows the operation of the interface circuit 300 according to the first embodiment during the initial setting period.

The CPU core 100 writes split information (for example, SPLIT[2:0]="011") to the split register 16a in synchronization with the rising edge of the first clock CLK (FIG. 2(a)). Based on the value of the split register 16a, the state machine 10 sets the valid flags VLD of the prefetch buffers PF1–PF3 to "1" in synchronization with the rising edge of the second clock CLK (FIG. 2(b, c, d)). That is, since "011" in binary is written to the split register 16a, the prefetch buffers PF1–PF3 function as interruption prefetch buffers and the prefetch buffers PF4–PF8 function as normal prefetch buffers after the initial setting period.

The CPU core 100 outputs the first interruption vector address IVCTAD1 to the data bus DB in synchronization with the rising edge of the third clock CLK. The state machine 10 writes the interruption vector address IVCTAD1 to the tag register TAG of the prefetch buffer PF1 in synchronization with the falling edge of the third clock CLK (FIG. 2(e)). Similarly, interruption vector addresses IVCTAD2-3 are written to the tag registers TAG of the prefetch buffers PF2 and PF3 in synchronization with the fourth and fifth clocks CLK, respectively (FIG. 2(f, g)). The valid flags VLD of the prefetch buffers PF4–8 retain low level, and the tag registers TAG and the data registers DATA thereof retain invalid data (FIG. 2(h)).

Next, the CPU core 100 writes "1" to the start register 16b in synchronization with the rising edge of the sixth clock CLK (FIG. 2(i)). In response to the setting of the start register 16b, the state machine 10 (SM10 in the chart) outputs the wait signal IWAIT to the CPU core 100 (FIG. 2(j)). While receiving the wait signal IWAIT, the CPU core 100 is in a wait state and stops updating the internal address IAD (READ state).

The state machine 10 controls the prefetch buffer unit 22 and the address generating unit 12 to read the interruption vector addresses IVCTAD1-3 retained in the tag registers TAG of the prefetch buffers PF1–3 in succession (PF1–3) and output the read interruption vector addresses IVCTAD1–3 to the internal memory 200 as memory access addresses MAD in synchronization with the eighth, tenth, and twelfth clocks CLK (FIG. 2(k, l, m)).

Then, the state machine 10 writes instruction data IVCTDT1-3 stored in the areas designated by the interruption vector addresses IVCTAD1–3, read from the internal memory 200, to the data registers DATA of the prefetch buffers PF1–3, respectively (FIG. 2(n, o, p)). The provision of the dedicated start register 16b allows the CPU core 100 to start the processing of storing the instruction data to the interruption prefetch buffers at desired timing. In addition, since the state machine 10 automatically performs the storing processing in response to a write to the start register 16b, the CPU core 100 can perform other processing during the storing processing.

After the instruction data IVCTDT1–3 is written to the prefetch buffers PF1–3, the state machine 10 turns the wait signal IWAIT to low level in synchronization with the rising edge of the fourteenth clock CLK (FIG. 2(q)). In response to the wait signal IWAIT of low level, the CPU core 100 resets the start register 16b to "0" (FIG. 2(r)). Subsequently, the CPU core 100 resumes normal instruction fetching after the sixteenth clock cycle.

The writing of the tag addresses and instruction data to the interruption prefetch buffers shown in FIG. 2 has only to be performed once in the initial setting period (startup routine) after power-on resetting. This means no deterioration in the entire system performance.

Figure 3:
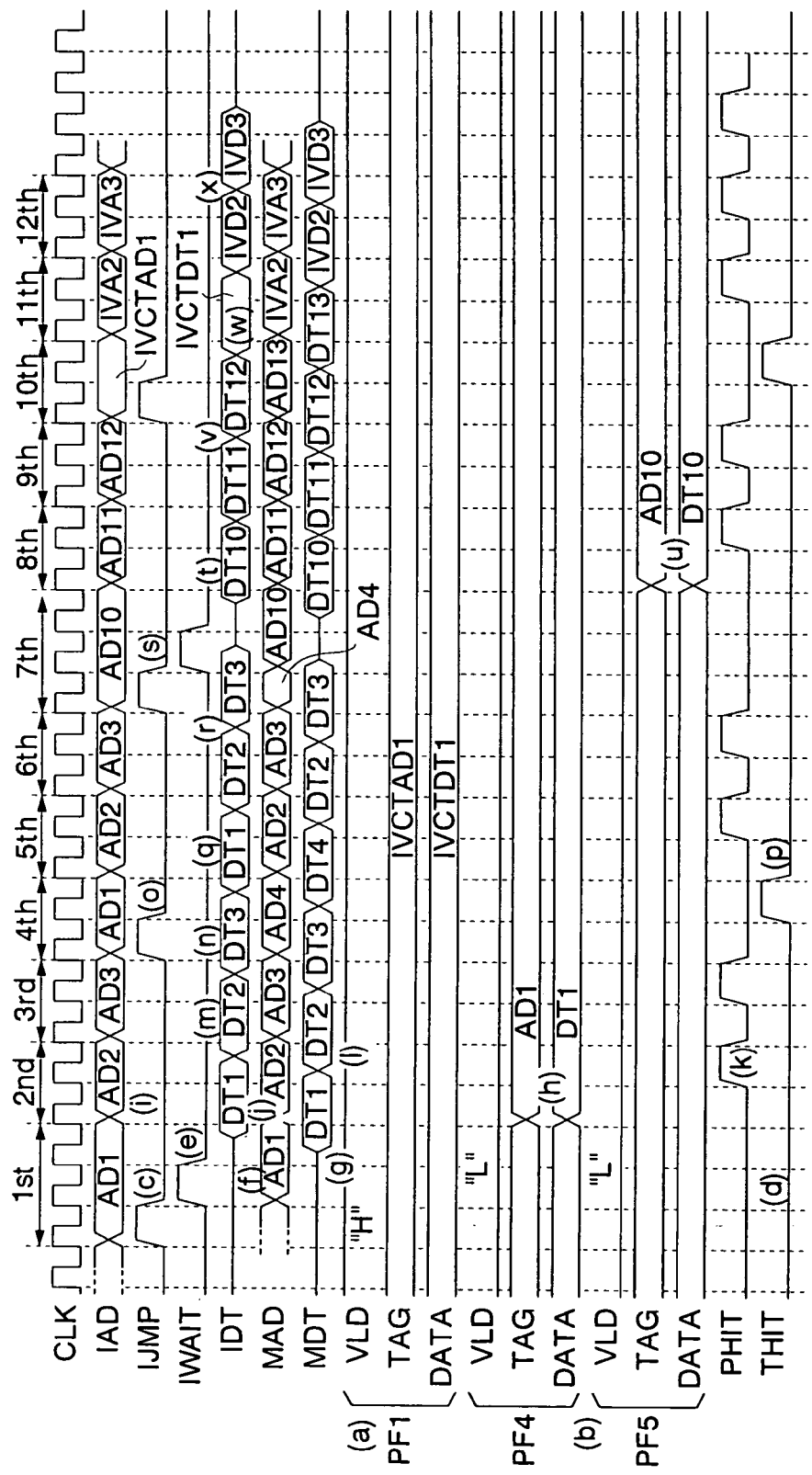
FIG. 3 is a timing chart showing the operation of the first embodiment during a normal operation period.

FIG. 3 shows the operation of the interface circuit 300 according to the first embodiment during the normal operation period.

In this example, the initial setting operation shown in FIG. 2 has been performed in advance, so that the prefetch buffers PF1–3 are assigned as interruption prefetch buffers. For example, the prefetch buffer PF1 retains the interruption vector address IVCTAD1 and the instruction data IVCTDT1, and has its valid flag VLD set to high level (FIG. 3(a)). The valid flags VLD of the prefetch buffers PF4–8, assigned as normal prefetch buffers, are reset to low level (FIG. 3(b)).

Initially, normal branching occurs in the first access cycle 1 st, and the CPU core 100 outputs the internal address IAD (AD1) and the branch signal IJMP (FIG. 3(c)). Since the address AD1 is not retained in any of the tag registers TAG of the prefetch buffers PF1–8, the tag hit signal THIT will not be output (FIG. 3(d)). The state machine 10 shown in FIG. 1 receives the prefetch hit signal PHIT and tag hit signal THIT of low level, and outputs the wait signal IWAIT to the CPU core 100 (FIG. 3(e)). While receiving the wait signal IWAIT, the CPU core 100 extends the access cycle.

The address generating unit 12 receives the increment signal INC output from the state machine 10 in response to the branch signal IJMP, and outputs the memory access address MAD (AD1) (FIG. 3(f)). Instruction data DT1 is read to the instruction data bus MDT from the area of the internal memory 200 corresponding to the address AD1 (FIG. 3(g)). The instruction data DT1 is transferred through the data selecting unit 18 to the instruction data bus IDT, and fetched by the CPU core 100. The access cycle is rendered three clock cycles since the instruction data DT1 must be read from the internal memory 200 directly.

The state machine 10 writes the address AD1 and the instruction data DT1 to the tag register TAG and data register DATA of an available prefetch buffer PF4 (FIG. 3(h)). Writing the address AD1 and the instruction data DT1 to the available prefetch buffer PF4 increases the probability of hit of the tag registers TAG and improves the fetch efficiency of instruction data. As a result, the CPU core 100 improves in performance. Note that, if there is no prefetch buffer available, the state machine 10 rewrites the values of the tag register TAG and data register DATA of the earliest-written prefetch buffer with the address AD1 and the instruction data DT1.

At the second access cycle 2nd, the CPU core 100 outputs the internal address IAD (AD2) subsequent to the address AD1 (FIG. 3(i)). Before the address generating unit 12 receives the address AD2 from the CPU core 100, it outputs the address AD2 that is generated in response to the address AD1, to the internal memory 200 as the memory access address MAD (FIG. 3(j)). Since the internal address IAD (AD2) from the CPU core 100 and the memory access address MAD (AD2) generated by the address generating unit 12 coincide with each other, the address comparing unit 14 outputs the prefetch hit signal PHIT (FIG. 3(k)).

The data buffer 20 prefetches the instruction data MDT (DT2) read from the internal memory 200 (FIG. 3(l)). In response to the prefetch hit signal PHIT, the data selecting circuit 18 transfers the instruction data DT2 from the data buffer 20 to the instruction data bus IDT (FIG. 3(m)). Since the instruction data DT2 corresponding to the address AD2 is prefetched by the data buffer 20, the access cycle is two clock cycles which are the shortest. That is, the fetch efficiency of the instruction data improves.

At the next access cycle 3rd, the memory interface circuit 300 operates as in the access cycle 2nd, outputting the instruction data DT3 to the CPU core 100 in two clock cycles (FIG. 3(n)).

At the access cycle 4th, the CPU core 100 outputs an address AD1 (branch address) not successive to the address AD3 as the internal address IAD, and outputs the branch signal UMP simultaneously (FIG. 3(o)). The address comparing unit 14 receives the tag address TAD (AD1) from the prefetch buffer unit 22, recognizes that the address AD1 is retained in the prefetch buffer PF4, and outputs the tag hit signal THIT (FIG. 3(p)).

In response to the tag hit signal THIT, the data selecting circuit 18 transfers the instruction data DT1 from the data register DATA of the prefetch buffer PF4 to the instruction data bus IDT (FIG. 3(q)). Since the instruction data DT1 corresponding to the address AD1 is read from the prefetch buffer PF4, the access cycle is two clock cycles which are the shortest.

Subsequently, at the access cycles 5th and 6th, the memory interface circuit 300 operates as in the access cycle 2nd, outputting the instruction data DT2 and DT3 to the CPU core 100 in two clock cycles each (FIG. 3(r)).

At the access cycle 7th, the CPU core 100 outputs an address AD10 (branch address) not successive to the address AD3 as the internal address IAD, and outputs the branch signal IJMP simultaneously (FIG. 3(s)). The memory interface circuit 300 operates as in the access cycle 1st, outputting instruction data DT10 corresponding to the address AD10 to the CPU core 100 in three clock cycles (FIG. 3(t)). The state machine 10 writes the address AD10 and the instruction data DT10 to the tag register TAG and data register DATA of an available prefetch buffer PF5 (FIG. 3(u)).

The access cycles 8th and 9th are executed the same as the access cycles 2nd and 3rd are, so that the prefetched instruction data DT11 and DT12 is output to the CPU core 100 (FIG. 3(v)).

At the access cycle 10th, an interruption occurs with the interruption vector address IVCTAD1 which is set in the prefetch buffer PF1. Because of the tag hit, the memory interface circuit 300 operates as in the access cycle 4th, outputting the instruction data IVCTDT1 to the CPU core 100 in two clock cycles (FIG. 3(w)).

The access cycles 11th and 12th are executed the same as the access cycles 2nd and 3rd are, so that instruction data IVD2 and IVD3 prefetched corresponding to addresses IVA2 and IVA3 generated by the address generating unit 12 is output to the CPU core 100 (FIG. 3(x)).

As has been described, according to the present embodiment, a predetermined number of ones of the prefetch buffers PF1–8 are previously assigned as interruption prefetch buffers which are disabled for rewrite before the normal operation period. Consequently, even if branch addresses or interruption vector addresses are output from the CPU core 100 frequently during the normal operation period, it is possible to prevent the values of the interruption prefetch buffers from being rewritten. As a result, the CPU core 100 can be improved in instruction fetch efficiency, with an improvement in the entire system performance. The fetch efficiency can be improved particularly in such systems that branch addresses or interruption vector addresses occur frequently and some of the addresses repeatedly.

The number of interruption prefetch buffers can be set to a desired number by setting the split register 16a. In other words, since the number of interruption prefetch buffers to be assigned is variable, it is possible to provide an optimum memory interface circuit for the system.

During the initial setting period, only the CPU core 100's setting the start register 16b allows the state machine 10 to automatically store the instruction data in the data registers DATA of the interruption prefetch buffers. This realizes an improvement in the performance of the CPU core 100 during the initial setting period.

When consecutive internal addresses IAD occur from the CPU core 100, the instruction data stored in the internal memory 200 can be prefetched by using memory access addresses MAD generated by the address generating unit 12. It is therefore possible to improve the fetch efficiency of the instruction data. Besides, the instruction data corresponding to the consecutive internal addresses IAD need not be retained in the prefetch buffer unit 22. The prefetch buffers PF1–8 can thus be minimized in number. Since the memory interface circuit 300 is provided with the data buffer 20, the prefetched instruction data can be output to the CPU core 100 without loss.

The valid flags VLD facilitate recognizing which of normal prefetch buffers and interruption prefetch buffers the prefetch buffers PF1–8 are assigned to. As a result, the operation of the state machine 10 can be simplified.

Figure 4:
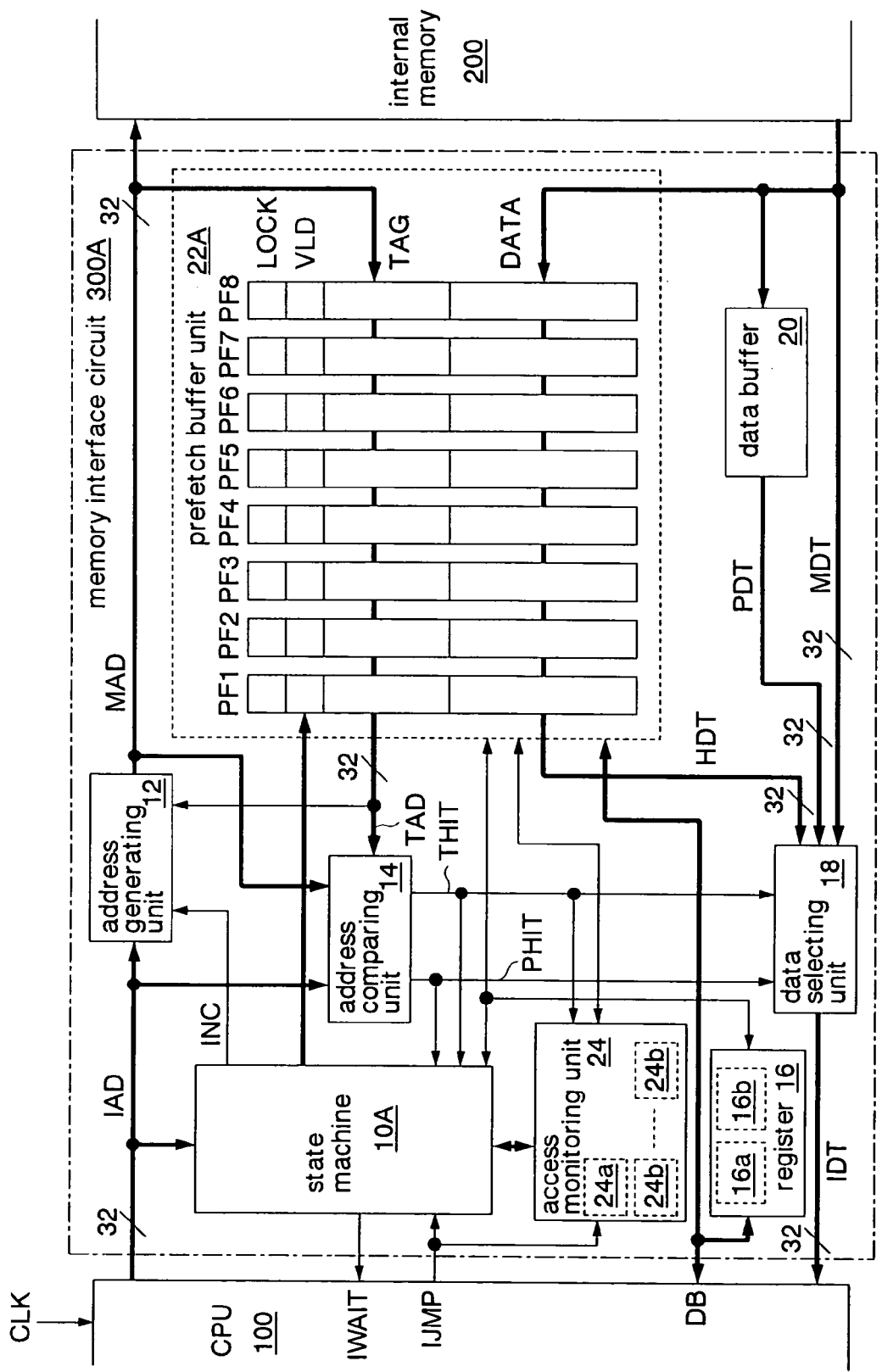
FIG. 4 is a block diagram showing a second embodiment of the memory interface circuit of the present invention.

FIG. 4 shows a second embodiment of the memory interface circuit of the present invention. The same elements as those described in the first embodiment will be designated by identical reference numbers or symbols. Detailed description thereof will be omitted here.

A memory interface circuit 300A has a state machine 10A and a prefetch buffer unit 22A instead of the state machine 10 and the prefetch buffer unit 22 of the first embodiment. Moreover, the memory interface circuit 300A has an access monitoring unit 24 additionally.

This embodiment is characterized in that the prefetch buffers PF1–8 are switched from interruption prefetch buffers to normal prefetch buffers depending on the frequency of occurrence of branch addresses (including interruption vector addresses) retained in the prefetch buffer unit 22A from the CPU core 100. The frequency of occurrence is checked by the access monitoring unit 24. The usage of the prefetch buffers are switched by the state machine 10A.

The prefetch buffers PF1–8 of the prefetch buffer unit 22A each have a lock flag LOCK consisting of a single bit, aside from a valid flag VLD, a tag resister TAG, and a data register DATA. The lock flag LOCK is a bit for inhibiting the switching of an interruption prefetch buffer to a normal prefetch buffer.

The access monitoring unit 24 has a branch counter 24a for counting the number of occurrences of the branch signal IJMP, and eight hit counters 24b for counting the numbers of hits of the prefetch buffers PF1–8, respectively. The branch counter 24a is reset, for example, upon every 100 occurrences of the branch signal IJMP. That is, the branch counter 24a repeats counter values of "0" to "100". The hit counters 24b are reset to "0" together with the branch counter 24a.

When the counter value of the branch counter 24a reaches "100", the state machine 10A reads the counter values of the hit counters 24b corresponding to the prefetch buffers PF1–8, respectively. Then, the state machine 10A sets "1" to the lock flags LOCK and valid flags VLD of the normal prefetch buffers (any of PF1–8) corresponding to hit counters 24b that exceed "10" in counter value, thereby switching these normal prefetch buffers to interruption prefetch buffers. In addition, the state machine 10A resets "0" to the lock flags LOCK and valid flags VLD of the interruption prefetch buffers (any of PF1–8) corresponding to hit counters 24b that do not exceed "10" in counter value, thereby switching these interruption prefetch buffers into normal prefetch buffers.

Figure 5:
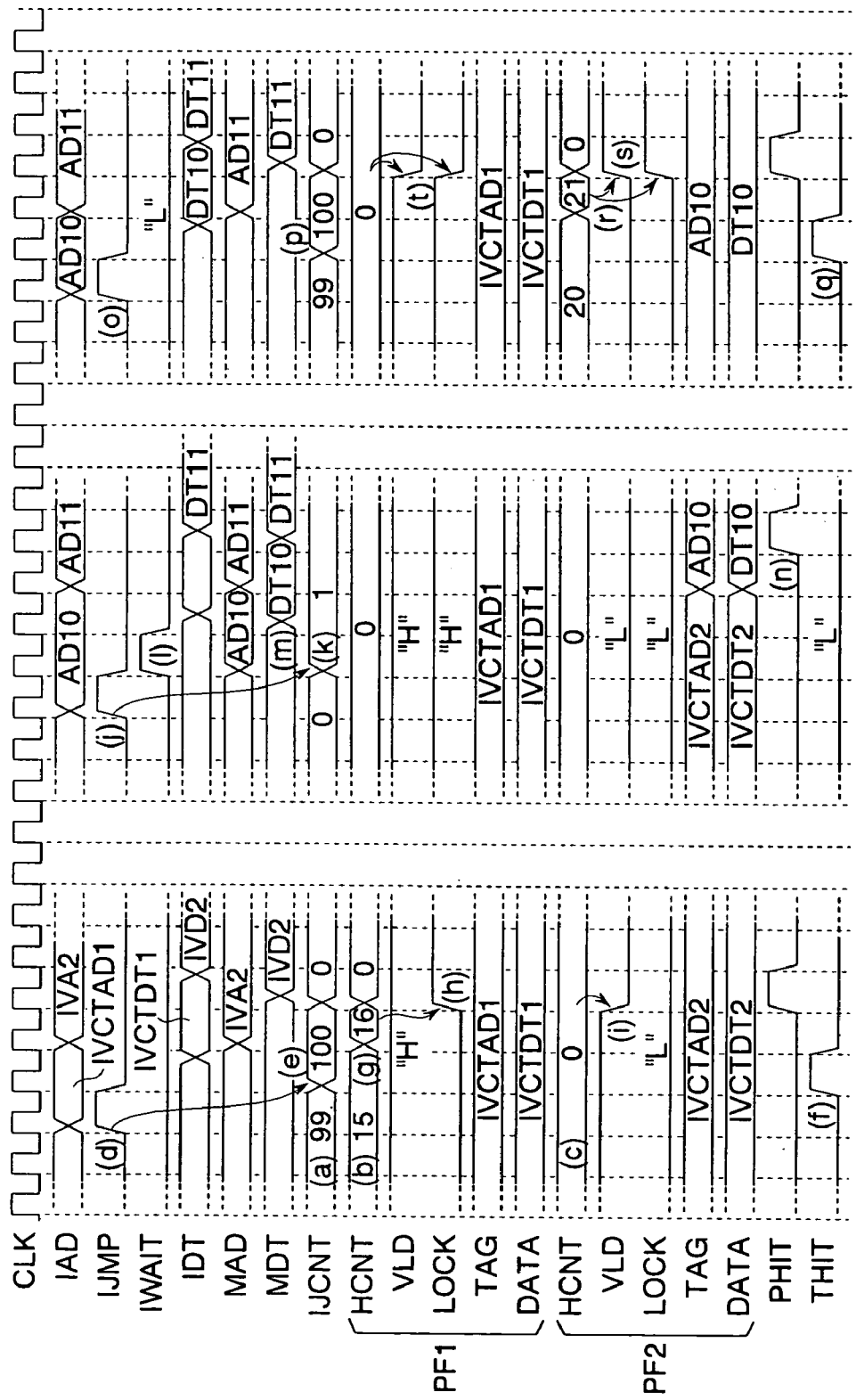
FIG. 5 is a timing chart showing the operation of the second embodiment during the normal operation period.

FIG. 5 shows the operation of the second embodiment during the normal operation period. The basic operations are the same as in the first embodiment (FIG. 3). Detailed description will thus be omitted of the same operations as in the first embodiment. Note that, the operation of the initial setting period is the same as in the first embodiment (FIG. 2) except that the lock flags LOCK are reset to "0".

At the beginning of the waveforms shown to the left in the chart, the branch counter 24a of the access monitoring unit 24 shown in FIG. 4 shows a counter value IJCNT of "99" (FIG. 5(a)). The hit counters 24b corresponding to the prefetch buffers PF1 and PF2 show counter values HCNT of "15" and "0", respectively (FIG. 5(b, c)).

In the waveforms shown to the left in the chart, an interruption occurs with the interruption vector address IVCTAD1 which is set in the prefetch buffer PF1, so that the branch signal IJMP is output (FIG. 5(d)). The access monitoring unit 24 counts up the branch counter 24a in response to the branch signal IJMP, setting the counter value IJCNT to "100" (FIG. 5(e)). Since the prefetch buffer PF1 retains the interruption vector address IVCTAD1, the address comparing unit 14 outputs the tag hit signal THIT (FIG. 5(f)). In response to the tag hit signal THIT, the access monitoring unit 24 increments the counter value HCNT of the hit counter 24b corresponding to the prefetch buffer PF1 (FIG. 5(g)).

Since the hit counter 24b corresponding to the prefetch buffer PF1 exceeds "10" in counter value, the access monitoring unit 24 sets the lock flag LOCK of the prefetch buffer PF1 to "1" (FIG. 5(h)). That is, the prefetch buffer PF1 keeps functioning as an interruption prefetch buffer.

Since the hit counter 24b corresponding to the prefetch buffer PF2 does not exceed "10" in counter value, the access monitoring unit 24 resets the valid flag VLD of the prefetch buffer PF2 to "0" (FIG. 5(i)). That is, the prefetch buffer PF2 is switched from an interruption prefetch buffer to a normal prefetch buffer.

Subsequently, as shown by the waveforms in the center of the chart, the CPU core 100 outputs a branch address AD10 as the internal address IAD, and outputs the branch signal UMP simultaneously (FIG. 5(j)). The access monitoring unit 24 counts up the branch counter 24a in response to the branch signal IJMP, setting the counter value IJCNT to "1" (FIG. 5(k)). Since the branch address is not retained in any of the prefetch buffers PF1–PF8, the state machine 10 outputs the wait signal IWAIT to the CPU core 100 (FIG. 5(l)), and reads instruction data DT10 from the internal memory 200 (FIG. 5(m)).

The prefetch buffer PF2 is switched to a normal prefetch buffer. Thus, the branch address AD10 and the instruction data DT10 corresponding to the branch address AD10 are retained by the prefetch buffer PF2 (FIG. 5(n)).

The CPU core 100 continues its fetch operations, and the counter value IJCNT of the branch counter 24a counts up to "99" as in the waveforms shown to the right in the chart. The CPU core 100 outputs the branch address AD10 again along with the branch signal UMP (FIG. 5(o)). The access monitoring unit 24 counts up the branch counter 24a in response to the branch signal IJMP, setting the counter value IJCNT to "100" (FIG. 5(p)). Since the prefetch buffer PF2 retains the branch address AD10, the address comparing unit 14 outputs the tag hit signal THIT (FIG. 5(q)). In response to the tag hit signal THIT, the access monitoring unit 24 increments the counter value HCNT of the hit counter 24b corresponding to the prefetch buffer PF2 (FIG. 5(r)).

Since the hit counter 24b corresponding to the prefetch buffer PF2 exceeds "10" in counter value, the access monitoring unit 24 sets the lock flag LOCK and valid flag VLD of the prefetch buffer PF2 to "1" (FIG. 5(s)). Moreover, since the hit counter 24b corresponding to the prefetch buffer PF1 does not exceed "10" in counter value, the access monitoring unit 24 resets the lock flag LOCK and valid flag VLD of the prefetch buffer PF1 to "0" (FIG. 5(t)). That is, the prefetch buffer PF2 is switched from a normal prefetch buffer to an interruption prefetch buffer. The prefetch buffer PF1 is switched from an interruption prefetch buffer to a normal prefetch buffer.

This embodiment can provide the same effects as those of the first embodiment described above. Besides, in this embodiment, normal prefetch buffers retaining branch addresses or interruption vector addresses which occur with high frequency are switched to interruption prefetch buffers which are disabled for rewrite. It is therefore possible to improve the instruction fetch efficiency according to the actual operating state of the system. In addition, interruption prefetch buffers retaining branch addresses which occur with low frequency are switched to rewritable normal prefetch buffers. It is therefore possible to improve the instruction fetch efficiency according to the actual operating state of the system.

Figure 6:
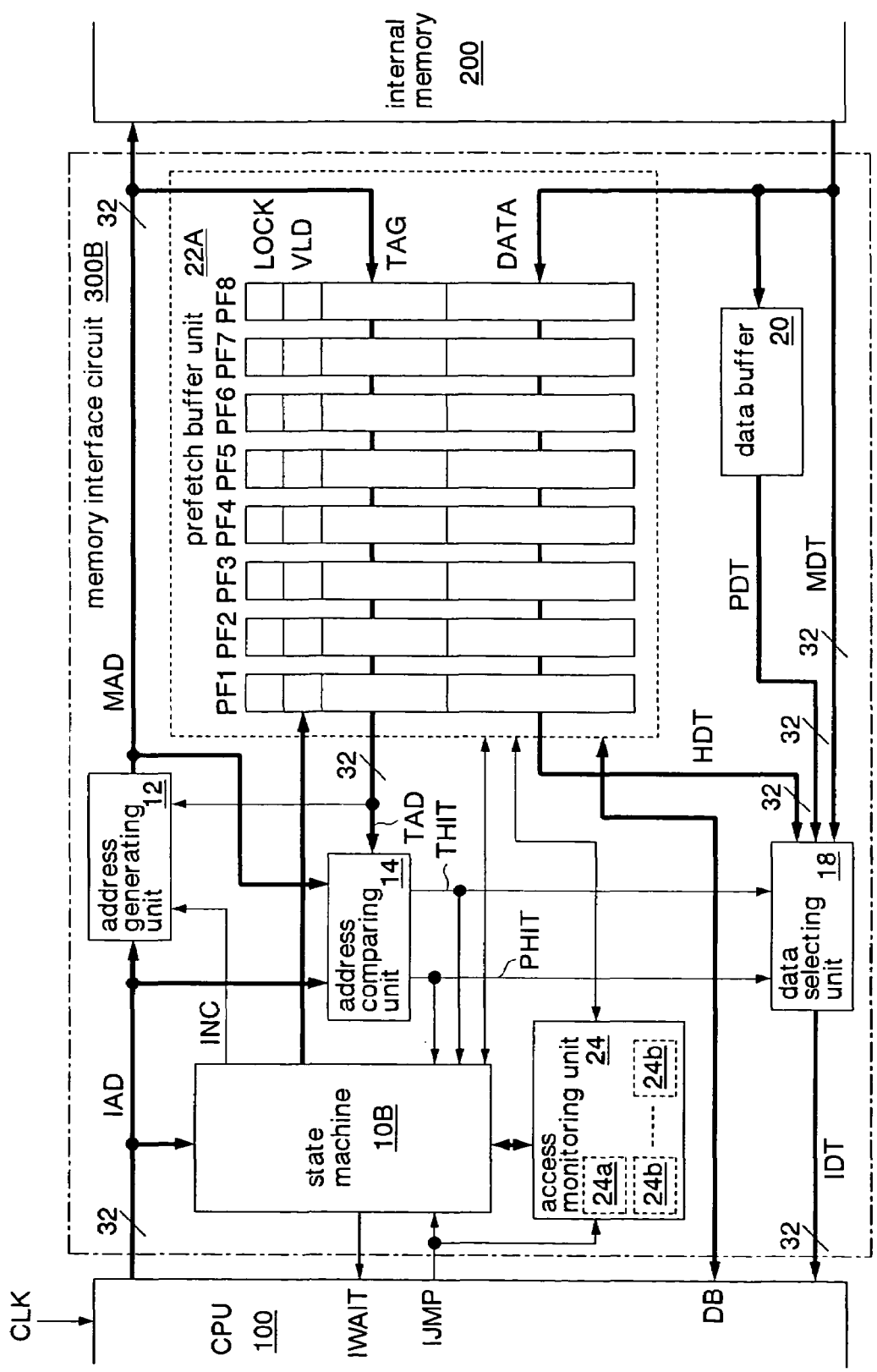
FIG. 6 is a block diagram showing a third embodiment of the memory interface circuit of the present invention.

FIG. 6 shows a third embodiment of the memory interface circuit of the present invention. The same elements as those described in the first and second embodiments will be designated by identical reference numbers or symbols. Detailed description thereof will be omitted here.

A memory interface circuit 300B has a state machine 10B instead of the state machine 10A of the second embodiment. Besides, the memory interface circuit 300B does not have the register 16. The rest of the configuration is almost the same as in the second embodiment.

The state machine 10B is configured without the initial setting function (the register 16 in FIG. 4) of the state machine 10A of the second embodiment. Thus, the prefetch buffer unit 22A will not be initialized. After power-on resetting, all the prefetch buffers PF1–8 are once assigned to normal prefetch buffers. During the normal operation period after the power-on resetting, as shown in the second embodiment (FIG. 5), the prefetch buffers PF1–8 are switched from interruption prefetch buffers to normal prefetch buffers depending on the numbers of tag hits.

This embodiment can provide the same effects as those of the first and second embodiments described above. Moreover, in this embodiment, there is no necessity to assign a predetermined number of ones of the prefetch buffers PF1–8 to interruption prefetch buffers during the initial setting period. This eliminates the need for the provision of the register 16 in the first embodiment, allowing the control circuit of the state machine 10B to be simplified in configuration. As a result, the memory interface circuit 300B can be made smaller in layout size.

Note that, the foregoing first embodiment has dealt with the case where the prefetch buffers PF1–3 retain the interruption vector addresses IVCTAD1–3. However, the present invention is not limited to such an embodiment. For example, the prefetch buffers PF1–3 may retain branch addresses that occur frequently.

The foregoing second embodiment has dealt with the case where the prefetch buffers PF1–8 are provided with their respective lock flags LOCK. However, the present invention is not limited to such an embodiment. For example, the valid flags VLD may have the function of the lock flags LOCK. In this case, in the initial setting operation shown in FIG. 3, the prefetch buffers PF1–3 having their valid flags VLD set to "1" are locked from the beginning of the normal operation period.

The foregoing embodiments have dealt with the cases where the present invention is applied to a memory interface circuit for accessing the internal memory 200 that is formed on a single chip microcomputer. However, the present invention is not limited to such embodiments. For example, the present invention may be applied to a memory interface circuit for accessing a memory chip separate from the one on which the CPU core is formed. Here, the memory interface circuit may be formed on the same chip as the CPU core is, or formed on a chip separate from the CPU core.

The invention is not limited to the above embodiments and various modifications may be made without departing from the spirit and scope of the invention. Any improvement may be made in part or all of the components.

What is claimed is:

1. A memory interface circuit comprising:
an address generating unit for outputting an internal address received from a central processor to an external memory as an access address when the internal address is a branch address, and for incrementing the branch address by one at every access cycle and outputting the incremented branch address as the access address until a next branch address is received, said access address being for prefetching instruction data stored in said external memory;
a plurality of prefetch buffers each having a tag register for storing a branch address, and a data register for storing instruction data stored in an area of said external memory designated by the branch address stored in the tag register;
a first address comparing unit for activating a tag hit signal when said internal address coincides with the branch address stored in the tag register;
a data selecting unit for outputting, to said central processor, instruction data read from the data register corresponding to the tag register containing the hit branch address when said tag hit signal is activated, and outputting, to said central processor, instruction data corresponding to the branch address read from said external memory when said tag hit signal is inactivated; and
a main control unit for controlling operation of said address generating unit, said first address comparing unit, and said data selecting unit during a normal operation period in which said central processor outputs internal addresses successively, and wherein
each of said prefetch buffers is assigned to either a first prefetch buffer which is rewritable during said normal operation period or a second prefetch buffer to be disabled for rewrite during said normal operation period and containing in advance a specified branch address and instruction data stored in an area of said external memory designated by the specified branch address.

2. The memory interface circuit according to claim 1, comprising
a split register in which one of a number of said prefetch buffers to be used as said first prefetch buffer(s) and a number of the same to be used as said second prefetch buffer(s) is registered, wherein
each of said prefetch buffers is assigned to either said first prefetch buffer or said second prefetch buffer during an initial setting period depending on a value of said split register, the initial setting period preceding said normal operation period.

3. The memory interface circuit according to claim 1, wherein
said main control unit receives the branch address through a data bus connected to said central processor and stores the received branch address in the tag register of said second prefetch buffer, and stores instruction data stored in an area of said external memory designated by the received branch address into the data register corresponding to the tag register of said second prefetch buffer during an initial setting period preceding said normal operation period.

4. The memory interface circuit according to claim 3, comprising
a start register to be set by a write from said central processor, wherein
during said initial setting period, said main control unit stores the branch address received through said data bus in the tag register of said second prefetch buffer, and then outputs the branch address stored in the tag register of said second prefetch buffer to said external memory through said address generating unit in response to the set start register, and stores instruction data read from said external memory in the data register corresponding to the tag register of said second prefetch buffer.

5. The memory interface circuit according to claim 1, comprising:
a data buffer for temporarily storing the instruction data prefetched from said external memory according to the access address; and
a second address comparing unit for outputting a prefetch hit signal when said internal address coincides with the access address for prefetching the instruction data from said external memory, wherein
said data selecting unit outputs the instruction data stored in said data buffer to said central processor when said prefetch hit signal is activated, and outputs, to said central processor, the instruction data corresponding to the branch address read from said external memory when said prefetch hit signal is inactivated.

6. The memory interface circuit according to claim 1, wherein
each of said prefetch buffers has a recognition flag for indicating which of said first or second prefetch buffer it is used for.

7. The memory interface circuit according to claim 1, comprising
a branch counter for counting a number of times said central processor outputs branch addresses during said normal operation period, wherein
upon determining that a ratio of a number of times at which the branch address stored in the tag register of said second prefetch buffer is hit to a counter value of said branch counter is equal to or less than a predetermined value during said normal operation period, said main control circuit switches the second prefetch buffer to said first prefetch buffer.

8. The memory interface circuit according to claim 7, wherein
each of said prefetch buffers has a recognition flag for indicating which of said first or second prefetch buffer it is used for.

9. A memory interface circuit comprising:
an address generating unit for outputting an internal address received from a central processor to an external memory as an access address when the internal address is a branch address, and for incrementing the branch address by one at every access cycle and outputting the incremented branch address as the access address until a next branch address is received, said access address being for prefetching instruction data stored in said external memory;
a plurality of prefetch buffers each having a tag register for storing a branch address, and a data register for storing instruction data stored in an area of said external memory designated by the branch address stored in the tag register;
a first address comparing unit for activating a tag hit signal when said internal address coincides with the branch address stored in the tag register;
a data selecting unit for outputting, to said central processor, instruction data read from the data register corresponding to the tag register containing the hit branch address when said tag hit signal is activated, and outputting, to said central processor, instruction data corresponding to the branch address read from said external memory when said tag hit signal is inactivated;
a branch counter for counting a number of times said central processor outputs branch addresses during said normal operation period; and
a main control unit for controlling operation of said address generating unit, said first address comparing unit, said data selecting unit, and said branch counter during a normal operation period in which said central processor outputs internal addresses successively, wherein:
each of said prefetch buffers is assigned to either a first prefetch buffer which is rewritable during said normal operation period or a second prefetch buffer to be disabled for rewrite during said normal operation period and containing in advance a specified branch address and instruction data stored in an area of said external memory designated by the specified branch address; and
upon determining a ratio of a number of times at which the branch address stored in the tag register of said first prefetch buffer is hit to a counter value of said branch counter exceeds a predetermined value during said normal operation period, said main control circuit switches the first prefetch buffer to said second prefetch buffer.

10. The memory interface circuit according to claim 9, wherein
upon determining a ratio of a number of times at which the branch address stored in the tag register of said second prefetch buffer is hit to a counter value of said branch counter is equal to or less than a predetermined value during said normal operation period, said main control circuit switches the second prefetch buffer to said first prefetch buffer.

11. The memory interface circuit according to claim 10, wherein
each of said prefetch buffers has a recognition flag for indicating which of said first or second prefetch buffer it is used for.

* * * * *